US010036940B2

(12) United States Patent
Tanaka

(10) Patent No.: US 10,036,940 B2
(45) Date of Patent: Jul. 31, 2018

(54) LENS APPARATUS AND IMAGE PROJECTOR USING THE SAME

(71) Applicant: CANON KABUSHIKI KAISHA, Tokyo (JP)

(72) Inventor: Junichi Tanaka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/709,749

(22) Filed: Sep. 20, 2017

(65) Prior Publication Data

US 2018/0101086 A1   Apr. 12, 2018

(30) Foreign Application Priority Data

Oct. 11, 2016 (JP) ................... 2016-200022
Aug. 31, 2017 (JP) ................... 2017-167282

(51) Int. Cl.
*G03B 21/14* (2006.01)
*G02B 7/04* (2006.01)
*G02B 27/00* (2006.01)

(52) U.S. Cl.
CPC ............ *G03B 21/142* (2013.01); *G02B 7/04* (2013.01); *G02B 27/0068* (2013.01); *G03B 21/147* (2013.01)

(58) Field of Classification Search
CPC ...... G03B 21/142; G03B 21/147; G03B 3/00; G03B 21/53; G02B 7/04; G02B 27/0068
USPC .................................................... 353/101, 69
See application file for complete search history.

(56) References Cited

U.S. PATENT DOCUMENTS

| 6,595,916 | B2 | 7/2003 | Minami et al. | |
|---|---|---|---|---|
| 2012/0320257 | A1* | 12/2012 | Shabtay | G02B 7/102 348/349 |
| 2017/0059972 | A1* | 3/2017 | Ichimura | G02B 13/16 |
| 2017/0227744 | A1* | 8/2017 | Sakata | G02B 13/08 |
| 2017/0307966 | A1* | 10/2017 | Tanaka | G03B 21/142 |

FOREIGN PATENT DOCUMENTS

| JP | H09230425 A | 9/1997 |
|---|---|---|
| JP | 2011145580 A | 7/2011 |
| JP | 2012203341 A | 10/2012 |
| JP | 2016109823 A | 6/2016 |

* cited by examiner

*Primary Examiner* — William C Dowling
(74) *Attorney, Agent, or Firm* — Rossi, Kimms & McDowell LLP

(57) ABSTRACT

To provide a lens apparatus and image projector using the same capable of easily fitting a projected image to a spherical screen by adjusting a field curvature, the lens apparatus according to the present invention includes a first optical system for changing the field curvature by moving in an optical-axis direction, a control unit for moving the first optical system to a target position in the optical-axis direction specified based on a predetermined amount input as a field curvature amount while a relationship between a position of the first optical system in the optical-axis direction and the field curvature amount is previously stored, a position detection unit for detecting a reference position of the first optical system in the optical-axis direction, and a movement amount detection unit for detecting a movement amount of the first optical system from the reference position to the target position in the optical-axis direction.

16 Claims, 14 Drawing Sheets

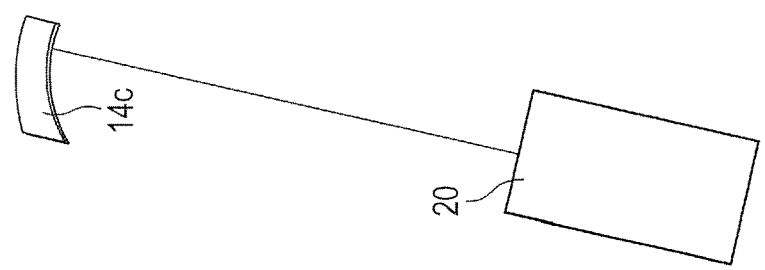
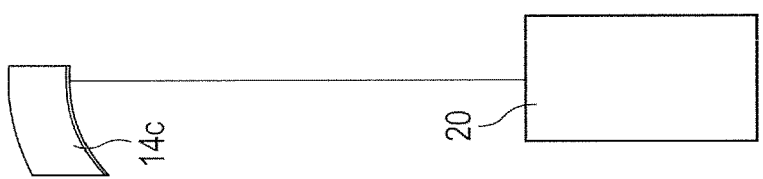
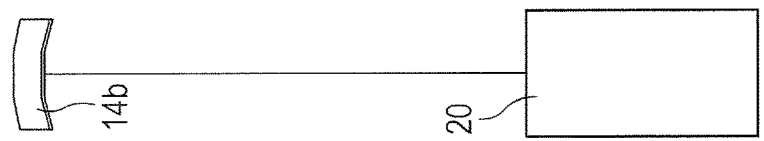
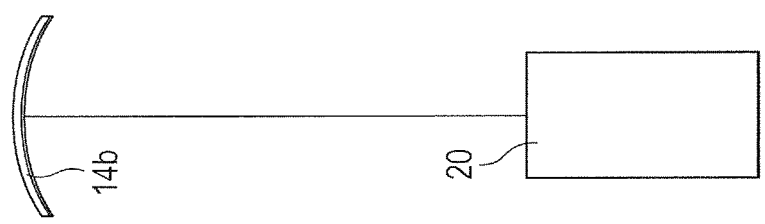

US 10,036,940 B2

LENS APPARATUS AND IMAGE PROJECTOR USING THE SAME

BACKGROUND OF THE INVENTION

Field of the Invention

The present invention relates to a lens apparatus and an image projector using the same, and particularly to a lens apparatus and an image projector using the same for fitting a projected image also to a spherical screen by adjusting field curvature.

Description of the Related Art

An image projector may project an image not only onto a plane screen but also onto a spherical screen. In this case, there has been known a projector for fitting a projected image to a spherical screen by adjusting field curvature (Japanese Patent Application Laid-Open No. 2011-145580).

However, there is desired not a conventional projector for heuristically fitting a projected image to a spherical screen by adjusting field curvature but a projector for fitting a projected image to a spherical screen more easily by adjusting field curvature.

SUMMARY OF THE INVENTION

It is an object of the present invention to provide a lens apparatus and an image projector using the same capable of easily fitting a projected image to a spherical screen by adjusting field curvature.

In order to achieve the object, a lens apparatus according to the present invention includes: a first optical system for changing a field curvature by moving in an optical-axis direction; a control unit for moving the first optical system to a target position in the optical-axis direction specified based on a predetermined amount input as a field curvature amount while a relationship between a position of the first optical system in the optical-axis direction and the field curvature amount is previously stored; a position detection unit for detecting a reference position of the first optical system in the optical-axis direction; and a movement amount detection unit for detecting a movement amount of the first optical system from the reference position to the target position in the optical-axis direction.

An image projector according to the present invention includes an image generation unit for generating an image and a holding member for holding the lens apparatus.

Further features of the present invention will become apparent from the following description of exemplary embodiments with reference to the attached drawings.

BRIEF DESCRIPTION OF THE DRAWINGS

FIG. 11A is a plan view illustrating a relationship between posture and position of the lens apparatus, and focus plane.

FIG. 11B is a plan view illustrating a relationship between posture and position of the lens apparatus, and focus plane.

FIG. 11C is a plan view illustrating a relationship between posture and position of the lens apparatus, and focus plane.

FIG. 11D is a plan view illustrating a relationship between posture and position of the lens apparatus, and focus plane.

DESCRIPTION OF THE EMBODIMENTS

Preferred embodiments of the present invention will now be described in detail in accordance with the accompanying drawings.

First Embodiment (Image Projector)

Figure 4:
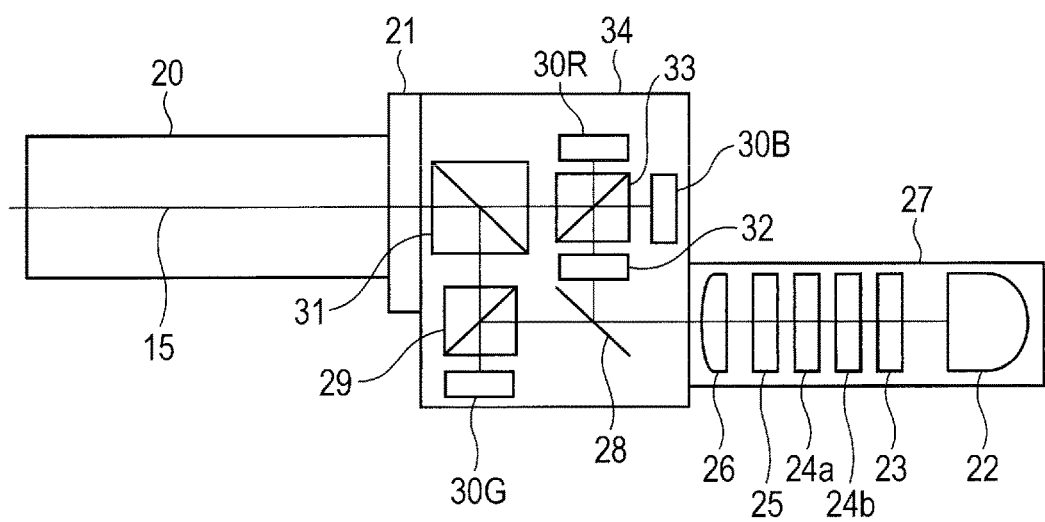
FIG. 4 is a diagram illustrating an optical system in an image projector mounting the lens apparatus according to the embodiments of the present invention as projection optical system thereon.
Figure 5A:
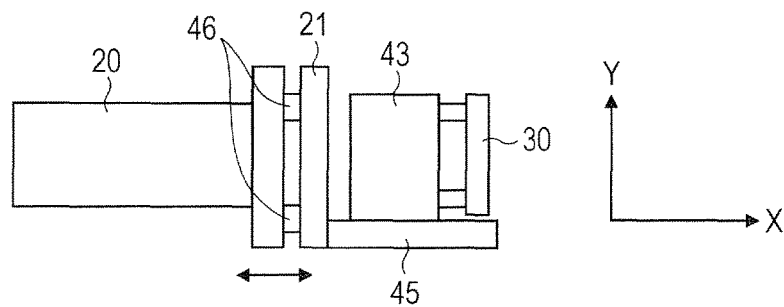
FIG. 5A is an explanatory diagram of the lens apparatus for making flange back adjustment according to the embodiments of the present invention.
Figure 5B:
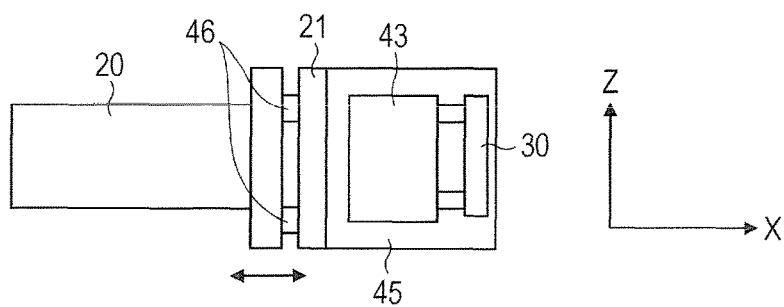
FIG. 5B is an explanatory diagram of the lens apparatus for making flange back adjustment according to the embodiments of the present invention.
Figure 5C:
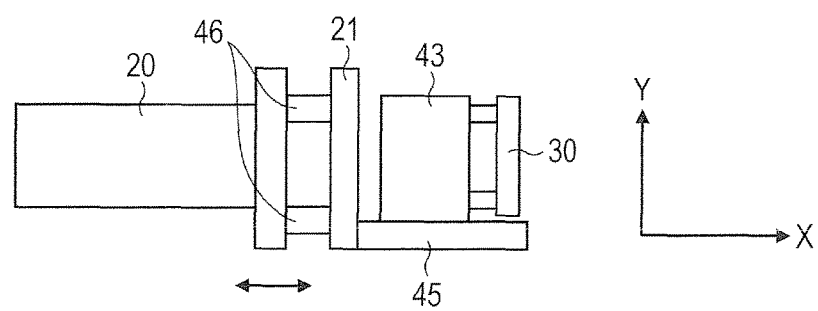
FIG. 5C is an explanatory diagram of the lens apparatus for making flange back adjustment according to the embodiments of the present invention.
Figure 5D:
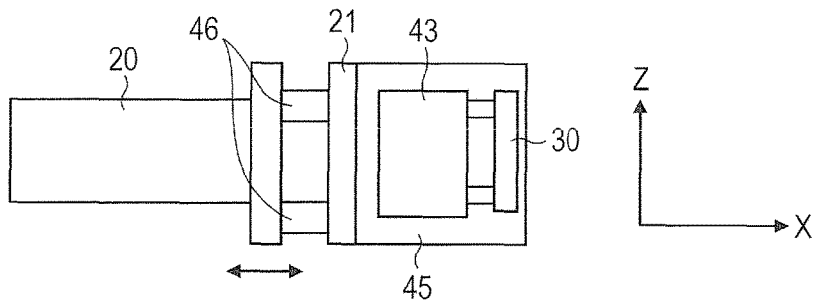
FIG. 5D is an explanatory diagram of the lens apparatus for making flange back adjustment according to the embodiments of the present invention.

An image projector using a lens apparatus as projection optical system according to an embodiment of the present invention will be described with reference to FIG. 4. FIG. 4 is directed for optically explaining the image projector, and thus FIG. 4 illustrates an optical system unit.

In FIG. 4, a lens apparatus 20 includes a lens capable of adjusting field curvature described below in detail. The lens apparatus 20 further includes a light source lamp 22, an UV cut filter 23 for cutting lights in a wavelength band in an ultraviolet range among lights generated by the light source lamp 22, and fly-eye lenses 24a and 24b for irradiating an image generation plane of a reflective liquid crystal panel 30 with a uniformly-bright light.

A PS conversion element 25 is directed for aligning polarization directions, and a condenser lens 26 is directed for arranging a light on the image generation plane of the reflective liquid crystal panel 30 (30R, 30G, 30B). Further, an illumination unit 27 includes the light source lamp 22, the UV cut filter 23, the fly-eye lenses 24, the PS conversion element 25, and the condenser lens 26.

A dichroic mirror 28 is directed for transmitting a light in green wavelength band and reflecting lights in other wavelength bands. A light transmitting through the dichroic mirror 28 is reflected by green prism 29, and is incident into the green reflective liquid crystal panel 30G. The light is reflected on the reflective liquid crystal panel 30G and then arrives at color combination prism 31.

A red light reflected by the dichroic mirror 28 transmits through color select 32, transmits through blue/red prism 33, is incident into the red reflective liquid crystal panel 30R, and then arrives at the color combination prism 31. A blue light reflected by the dichroic mirror 28 transmits through the color select 32 to change the polarization direction, is reflected on the blue/red prism 33, is incident into the blue reflective liquid crystal panel 30B, and then arrives at the color combination prism 31. The lights of three colors of red, blue, and green, which arrive at the color combination prism 31, are projected on a screen (not illustrated) via the lens apparatus 20 as projection optical system held by a lens shift unit 21.

(Lens Shift Unit 21)

Figure 6:
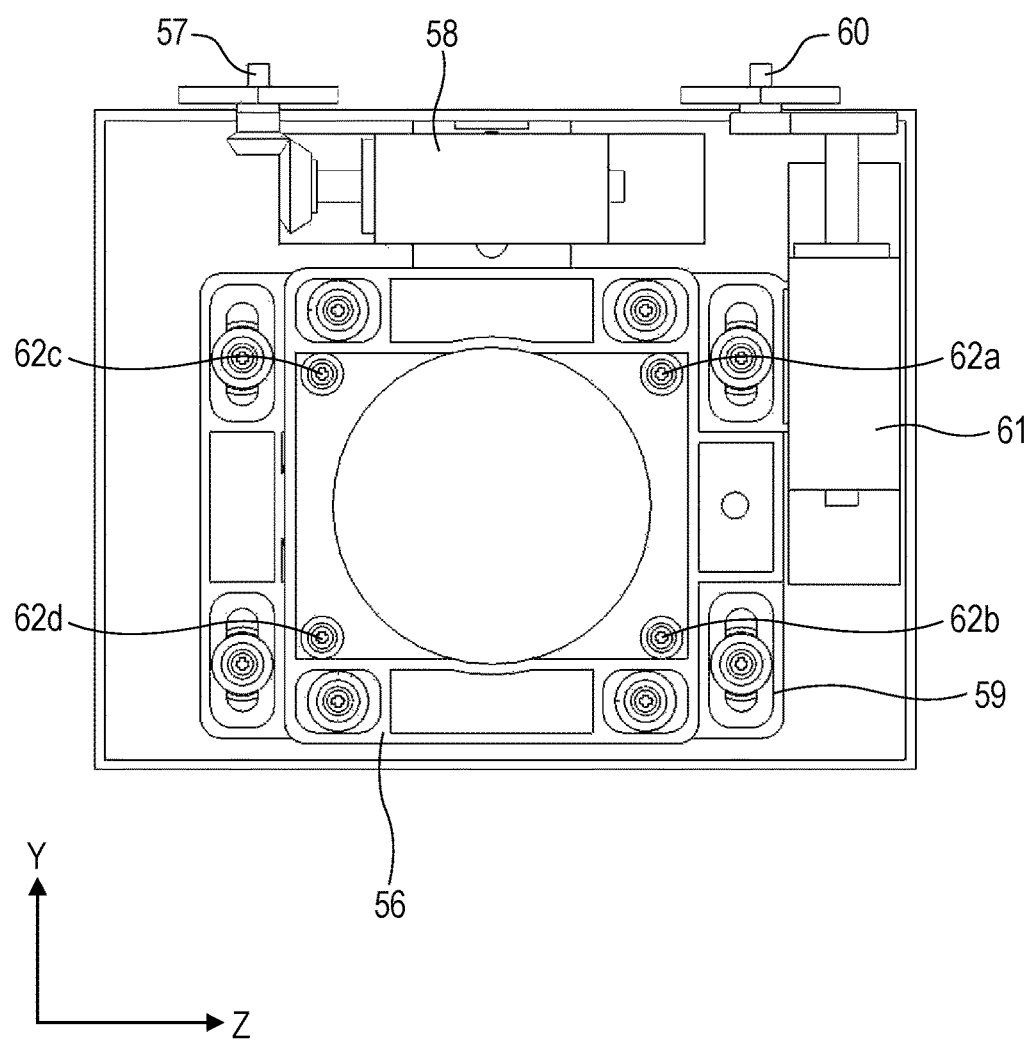
FIG. 6 is an explanatory diagram of a lens shift unit in the lens apparatus according to the embodiments of the present invention.

An outline of the lens shift unit 21 illustrated in FIG. 4 will be further illustrated in FIG. 6. A Z-direction movement dial 57 is operated so that the lens shift unit 21 moves both a z-direction movement plate 56 and the lens apparatus 20 in the Z direction of the ZY plane. At this time, a position of the Z-direction movement plate 56 is detected by a Z-direction position detection sensor 58. A Y-direction movement dial 60 is operated so that the lens shift unit 21 moves both a Y-direction movement plate 59 and the lens apparatus 20 in the Y direction of the ZY plane. A position of the Y-direction movement plate 59 is detected by a Y-direction position detection sensor 61 at this time. Lens attachment units 62a, 62b, 62c, and 62d are illustrated in FIG. 6.

(Lens Apparatus 20)

The lens apparatus 20 illustrated in FIG. 4 will be described below with reference to FIGS. 1A to 3B. A field curvature adjustment unit (first optical system) 1 moves in an optical-axis direction 15 to change a degree of field curvature of a projected image 14 as 14a, 14b, or 14c. Specifically, a field curvature adjustment unit position detection gear 19 (FIG. 3A) integral with the field curvature adjustment unit 1 is rotated by a field curvature adjustment motor 70 so that the field curvature adjustment unit 1 can move in the optical-axis direction 15. A field curvature adjustment unit position detection sensor 7 (FIG. 1B) as position detection unit is rotated via the field curvature adjustment unit position detection gear 19 integral with the field curvature adjustment unit 1, thereby to detect a position of the field curvature adjustment unit 1.

Figure 1A:
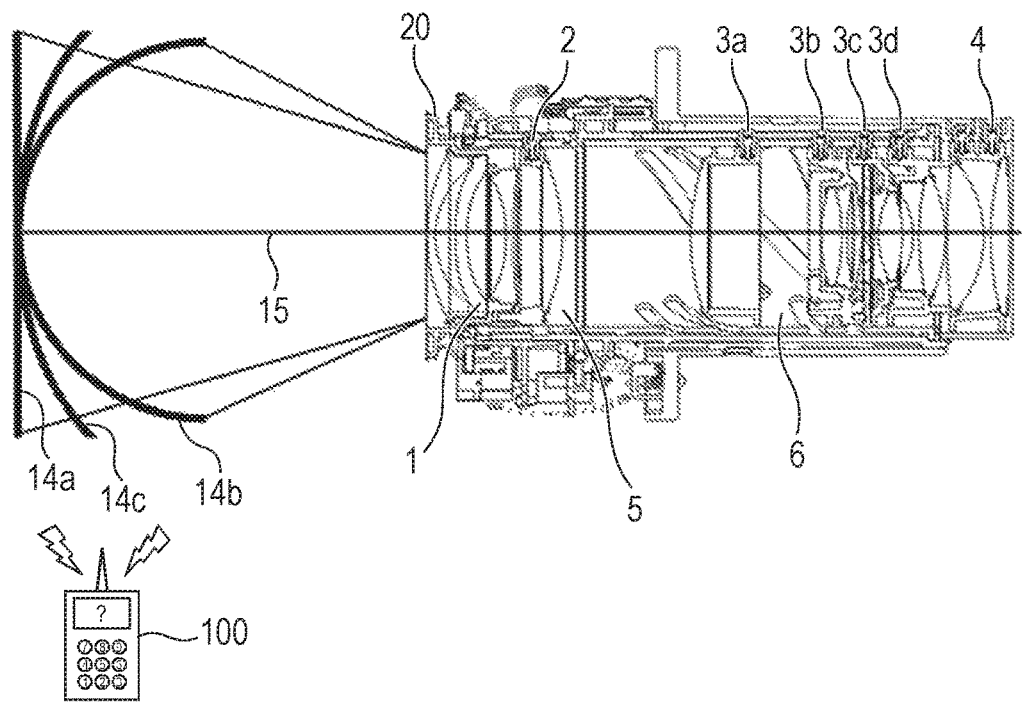
FIG. 1A is an explanatory diagram illustrating a lens apparatus for causing field curvature on a screen plane, and a screen.

The projected image 14 can be changed from 14a to 14c, 14b to be fit to the spherical screen. In FIG. 1A, a focus adjustment unit 2 moves in the optical-axis direction 15 to change a focus position, and a zoom adjustment unit 3 (3a, 3b, 3c, 3d) moves in the optical-axis direction 15 to change a projection magnification. A fixing unit 4 does not move.

A focus adjustment cam ring 5 is directed for moving the focus adjustment unit 2 in the optical-axis direction 15. A drive force of a focus adjustment motor 9 (FIG. 1B) is given to the focus adjustment cam ring 5 via a focus drive gear 16 (FIG. 3A) so that the focus adjustment unit 2 moves. A position of the focus adjustment unit 2 can be detected as follows. That is, an initial position of the focus adjustment unit 2 is detected by an end detection sensor 11 for detecting a focus adjustment position (FIG. 1B) and the movement amount therefrom or the number of rotations is detected by a rotation detection sensor 18 for detecting a focus adjustment unit position (FIG. 3B) as photointerrupter so that a position of the focus adjustment unit 2 can be detected.

Figure 1B:
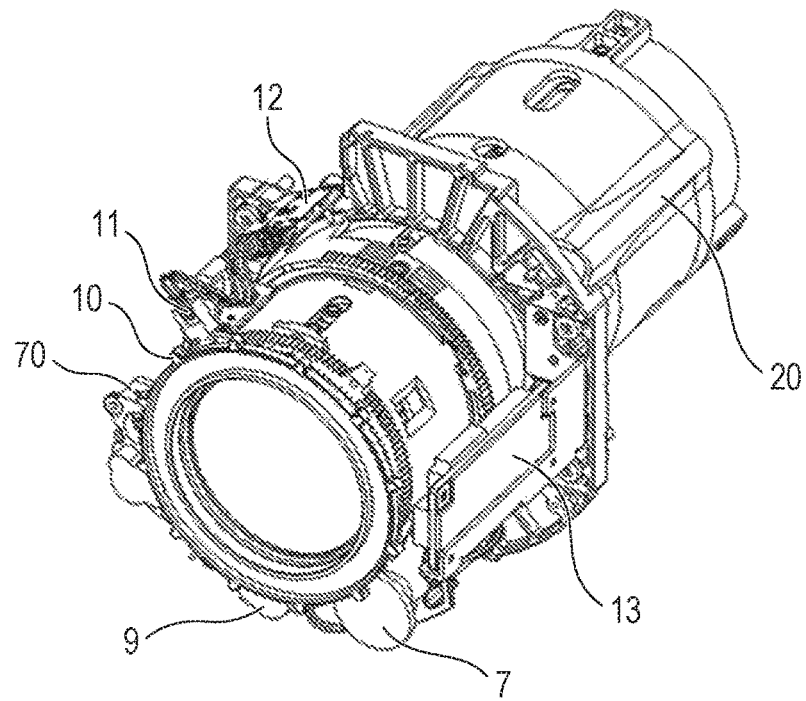
FIG. 1B is a perspective view of a lens apparatus according to embodiments of the present invention.
Figure 2A:
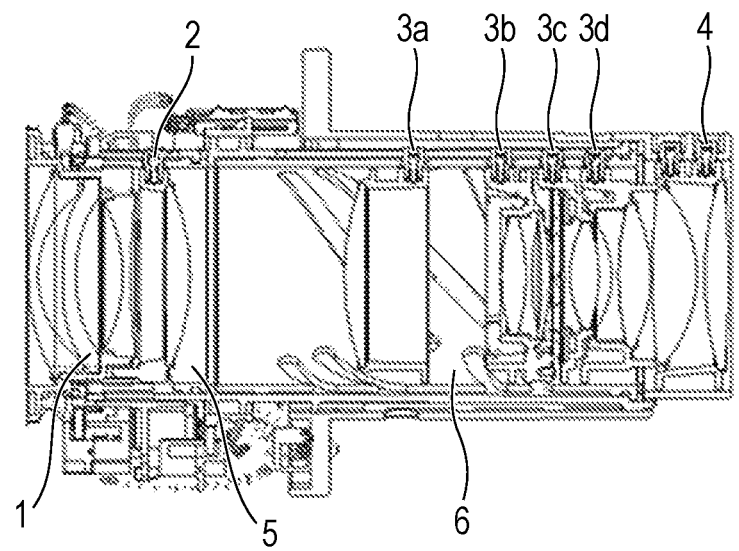
FIG. 2A is a cross-section view of the lens apparatus according to the embodiments of the present invention in the WIDE state.
Figure 2B:
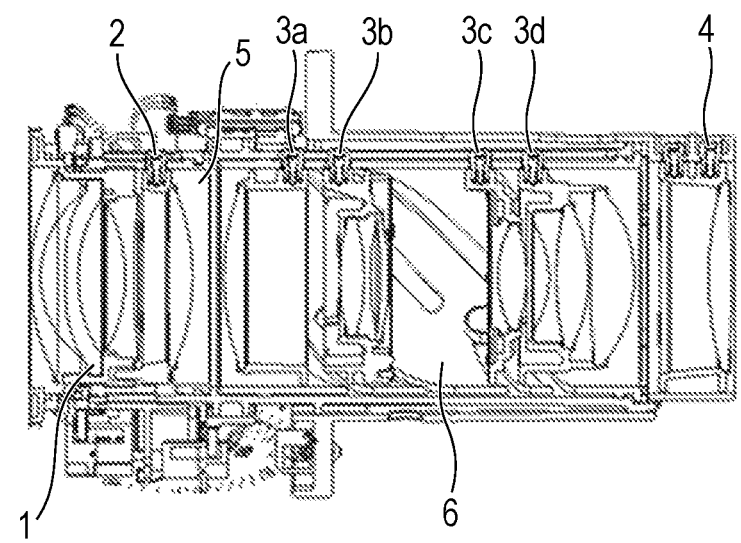
FIG. 2B is a cross-section view of the lens apparatus according to the embodiments of the present invention in the TELE state.
Figure 3A:
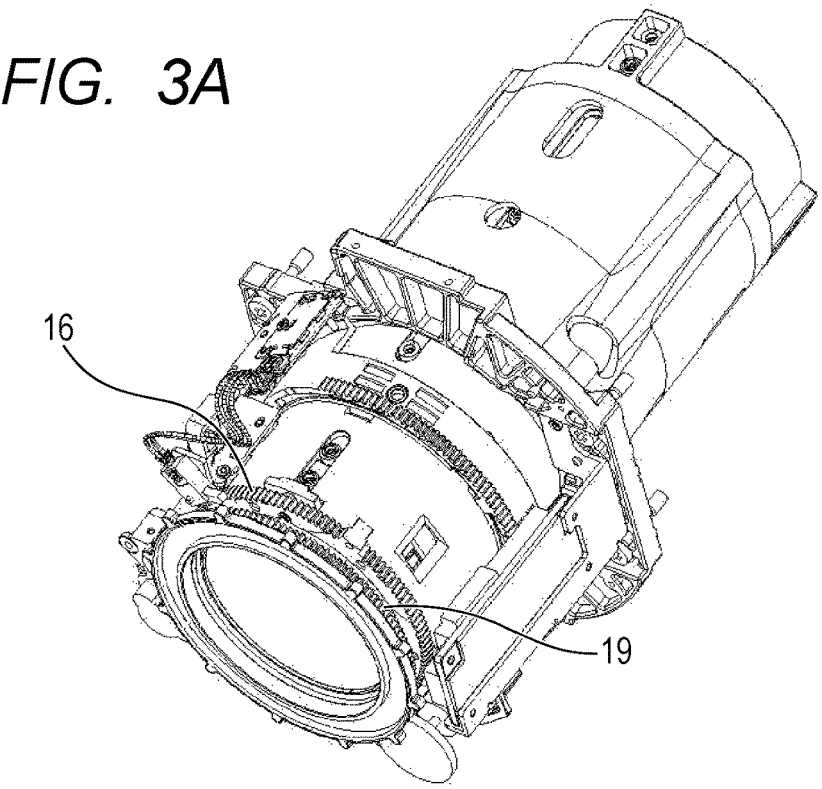
FIG. 3A is a perspective view of the lens apparatus according to the embodiments of the present invention.
Figure 3B:
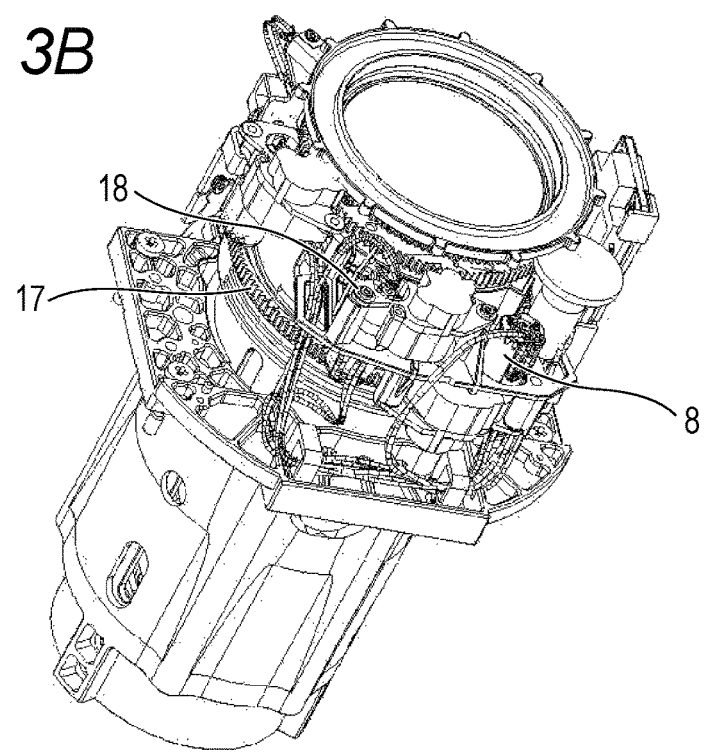
FIG. 3B is a perspective view of the lens apparatus according to the embodiments of the present invention.

A zoom adjustment cam ring 6 moves the zoom adjustment unit 3 in the optical-axis direction 15. Specifically, a drive force of a zoom adjustment motor 8 (FIG. 3B) is given to the zoom adjustment cam ring 6 via a zoom drive gear 17 (FIG. 3B) so that the zoom adjustment unit 3 moves. A position of the zoom adjustment unit 3 can be detected by a zoom adjustment position detection sensor (FIG. 1B). FIG. 2A illustrates the lens apparatus 2 at a zoom position of WIDE and FIG. 2B illustrates the lens apparatus 2 at a zoom position of TELE.

A remote controller 100 as input unit is used by a user for inputting the field curvature amount (such as curvature radius of the spherical screen as curvature radius of field curvature plane) in order to fit to the spherical screen. A value input by the remote controller 100 is received by a reception unit in a lens control board 13 (FIG. 1B) as control unit.

(To Store Relationship Between Position of Field Curvature Adjustment Unit 1 in Optical-Axis Direction and Field Curvature Amount)

The field curvature adjustment unit 1 is moved in the optical-axis direction thereby to intentionally cause field curvature as 14a, 14b or 14c in FIG. 1A and to fit it to the spherical screen. At this time, a measurement with respect to a focus needs to be made at a plurality of points on the screen in order to confirm whether a degree of the field curvature fits to the screen, and accurate fitting causes a higher degree of working difficulty and complicated working.

Figure 8:
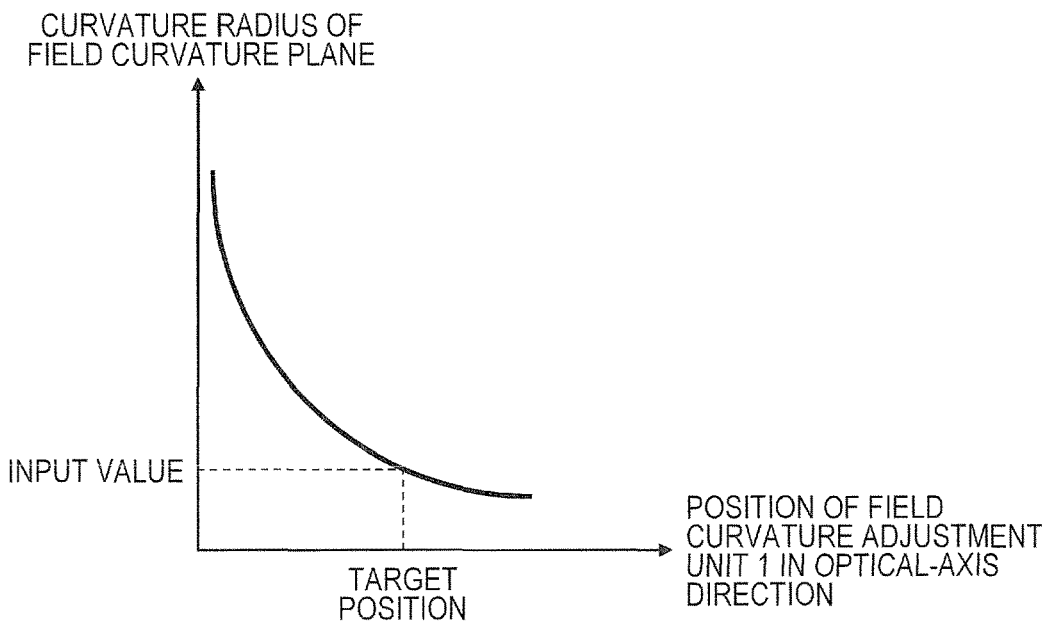
FIG. 8 is a diagram illustrating how to specify a target position of a field curvature adjustment unit in an optical-axis direction on the basis of an input value of a curvature radius of field curvature while a relationship between a position of the field curvature adjustment unit in the optical-axis direction and the curvature radius of the field curvature is stored.

Thus, according to the present embodiment, as illustrated in FIG. 8, a relationship between a position of the field curvature adjustment unit 1 in the optical-axis direction and the field curvature amount (such as curvature radius of the spherical screen as curvature radius of field curvature plane) is previously stored in the storage unit of the lens control board 13 as control unit. The user inputs the desired field curvature amount (such as curvature radius of the spherical screen) by use of the remote controller 100. The value input by the remote controller 100 is received by the lens control board 13 as control unit via wireless communication.

Thereby, the lens control board 13 specifies a target position of the field curvature adjustment unit 1 on the basis of the input value and the previously-stored information, sets the movement amount toward the target position and moves the field curvature adjustment unit 1 by the field curvature adjustment motor 70 as illustrated in FIG. 8.

Figure 9:
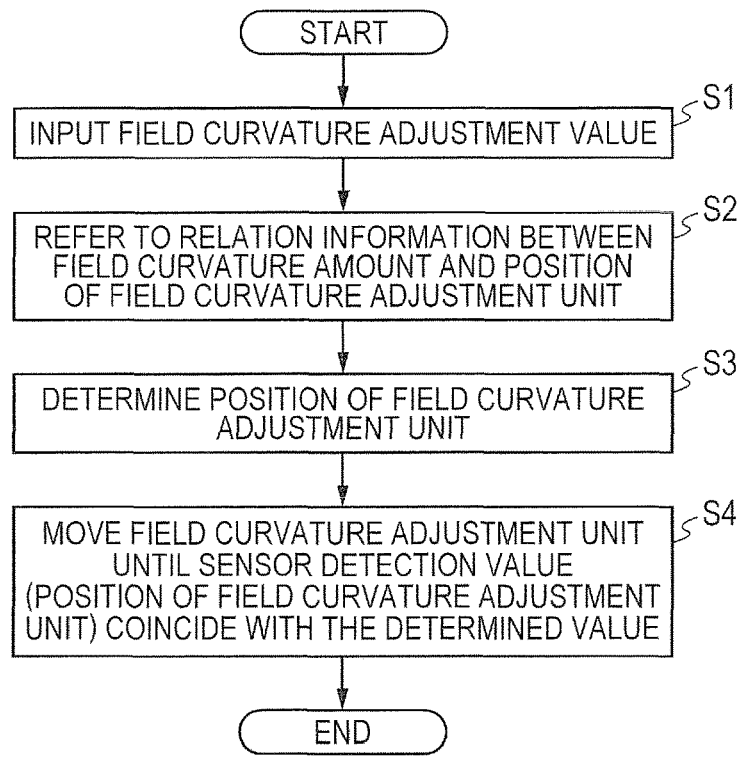
FIG. 9 is a flowchart of field curvature adjustment by use of an absolute position detection sensor.

In FIG. 9, an absolute encoder as position detection unit is provided for detecting whether the target position is reached or whether a detected position coincides with the target position.

Figure 10:
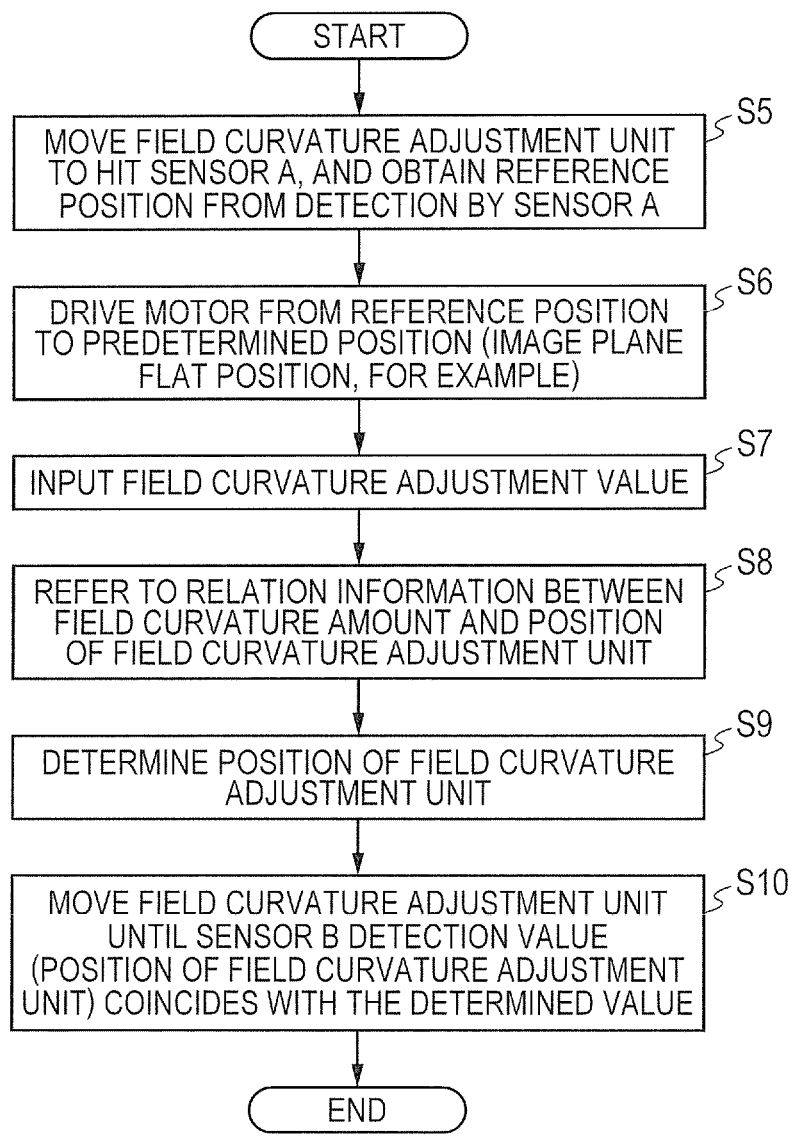
FIG. 10 is a flowchart of field curvature adjustment by use of a movement amount detection sensor.

There will be described below how to control field curvature adjustment when an absolute position detection sensor such as absolute encoder is used and when a movement amount detection sensor is used with reference to FIGS. 9 and 10.

(When Absolute Position Detection Sensor is Used)

Field curvature adjustment by use of an absolute position detection sensor will be described with reference to FIG. 9. In the flowchart of FIG. 9, the user first inputs a field curvature adjustment value into a projector by use of the remote controller 100 (S1). The information on the relationship between the field curvature adjustment amount and the position of the field curvature adjustment unit previously stored in the projector is referred to (S2) and a position (target position) of the field curvature adjustment unit as user-input field curvature adjustment value is determined (S3). The field curvature adjustment unit is then moved until a detection result by the absolute value detection sensor coincides with the position of the field curvature adjustment unit determined in S3, and then the field curvature adjustment is terminated (S4).

(When Movement Amount Detection Sensor is Used)

Field curvature adjustment by use of a movement amount detection sensor will be described below with reference to FIG. 10. When it is detected that field curvature adjustment such as user operation using the remote controller 100 is required first, the field curvature adjustment unit is moved to hit a sensor A and the sensor A detects that the field curvature adjustment unit hits the sensor A, thereby causing the projector to obtain a reference position (S5). The sensor A functions as position detection unit for detecting a reference position of the field curvature adjustment unit in the optical-axis direction. The motor is then driven for moving the field curvature adjustment unit from the reference position detected in S5 to an image plane flat position, for example (S6)

The user then inputs a field curvature adjustment value into the projector by use of the remote controller 100 (S7). The information on the relationship between the field curvature adjustment amount and the position of field curvature adjustment unit previously stored in the projector is referred to (S8), and a position of the field curvature adjustment unit as user-input field curvature adjustment value (target position where the image plane has target curvature) is determined (S9).

The field curvature adjustment unit is then moved until a detection result by a sensor B coincides with the position of the field curvature adjustment unit determined in S9, and the field curvature adjustment is terminated (S10). The sensor A is directed for detecting whether the field curvature adjustment unit hits the sensor A, and the sensor B is capable of detecting the rotation amount of the motor or the movement amount of the field curvature adjustment unit from a predetermined position.

As described above, a projected image can be subjected to field curvature to be easily fit to the spherical screen without a measurement on the spherical screen according to the present embodiment.

Second Embodiment

A lens apparatus according to a second embodiment includes a second optical system for changing a focus state by movement in the optical-axis direction, and the lens control board 13 as control unit moves the second optical system in the optical-axis direction to suppress a change in focus state when moving the first optical system 1 to a target position. The second embodiment is similar to the first embodiment in other points, and thus the description thereof will be omitted.

According to the present embodiment, a position of the focus adjustment unit 2 as second optical system, a position of the field curvature adjustment unit 1 as first optical system in the optical-axis direction, and the field curvature amount with respect to the positions (such as curvature radius of changed field curvature plane) are previously stored in the lens control board 13.

The user then inputs the desired field curvature amount (such as curvature radius of the spherical screen) by use of the remote controller 100. The value input by the remote controller 100 is received by the lens control board 13 via wireless communication, and the lens control board 13 moves the field curvature adjustment unit 1 to the target position on the basis of the user-input value and the previously-stored information, and moves the focus adjustment unit 2 to suppress a change in focus state. In this way, a projected image can be subjected to field curvature to be easily fit to the spherical screen without a measurement on the spherical screen also according to the present embodiment.

Third Embodiment

A lens apparatus according to a third embodiment includes a third optical system for changing a magnification by movement in the optical-axis direction, and the lens control board 13 as control unit moves the third optical system in the optical-axis direction to suppress a change in magnification when moving the first optical system 1 to a target position. The third embodiment is similar to the first embodiment in other points, and thus the description thereof will be omitted.

According to the present embodiment, a position of the zoom adjustment unit 3 as third optical system, a position of the field curvature adjustment unit 1 as first optical system in the optical-axis direction, and the field curvature amount with respect to the positions (such as curvature radius of changed field curvature plane) are previously stored in the lens control board 13.

The user then inputs the desired field curvature amount (such as curvature radius of the spherical screen) by use of the remote controller 100. The value input by the remote controller 100 is received by the lens control board 13 via wireless communication, and the lens control board 13 moves the field curvature adjustment unit 1 to the target position on the basis of the user-input value and the previously-stored information and moves the zoom adjustment unit 3 thereby to suppress a change in magnification. In this way, a projected image can be subjected to field curvature to be easily fit to the spherical screen without a measurement on the spherical screen also according to the present embodiment.

The second embodiment and the third embodiment can be employed together.

Fourth Embodiment

A fourth embodiment is directed for suppressing a change in brightness within an image plane due to a change in distance between the front and the back (the peripheral part and the center part) of the spherical screen in the optical-axis direction by adjustment of field curvature. The fourth embodiment is similar to the first embodiment in other points, and thus the description thereof will be omitted.

When the projected image 14 is changed from 14a to 14b in FIG. 1A, a relative distance in the optical-axis direction 15 is different between closer to the lens apparatus 20 and far away therefrom (between the peripheral part and the center part of the screen), and brightness is higher at a closer distance to the lens apparatus 20. That is, the outer periphery part of the screen as the front side of the screen in the shape 14b is brighter.

Thus, a position of the field curvature adjustment unit 1 in the optical-axis direction, and the brightness variation amount depending on a position on the projection plane (a difference in brightness between the peripheral part and the center part of the screen) are previously stored in the lens control board 13 according to the present embodiment. When the field curvature adjustment unit 1 is moved to the target position, the previously-stored brightness variation amount (difference in brightness between the peripheral part and the center part of the screen) is canceled (or reduced). Specifically, the lens control board 13 as control unit adjusts a distribution of brightness within an image created by the reflective liquid crystal panel 30. Thereby, irregular brightness in adjustment of field curvature can be automatically eliminated according to the present embodiment.

An illuminance changing unit for suppressing irregular brightness in adjustment of field curvature may be not only the reflective liquid crystal panel 30 as image generation unit for generating an image but also a stop provided in the lens apparatus or a stop provided in an optical path of an illumination light from the light source for illuminating the reflective liquid crystal panel 30.

Additionally, irregular brightness may be suppressed in adjustment of field curvature in consideration of the position information of the lens shift unit 21 or other position information on focus position and zoom position.

Fifth Embodiment

A fifth embodiment is directed for suppressing a back focus from being out due to adjustment of field curvature, and a focus from being out in the zoom operation. The fifth embodiment is similar to the first embodiment in other points, and thus the description thereof will be omitted.

In FIG. 1A, when the field curvature adjustment unit 1 is moved in the optical-axis direction to vary the projected image 14, the lens with a refractive index moves and thus a back focus varies. According to the present embodiment, the back focus variation amount relative to the movement amount of the field curvature adjustment unit 1 is optically calculated, and the amount to cancel the back focus variation amount is stored in the lens control board 13. In order to reflect individual differences such as component tolerance and production error, the amount to cancel the back focus variation amount relative to the field curvature adjustment unit 1 may be stored in the lens control board 13 in a manufacturing step.

When field curvature adjustment is performed, the adjustment amount is detected by the field curvature adjustment unit position detection sensor 7. The amount to cancel the back focus variation amount relative to the adjustment amount of the field curvature adjustment unit 1 previously stored in the lens control board 13 is calculated. A lens expandable pin 46 (FIGS. 5A to 5D and 7A and 7B) as distance changing unit is rotated by a lens expandable pin motor 74 (FIGS. 7A and 7B) to be expanded or shrunk by the calculated correction amount. In this way, an interval between the lens apparatus 20 and reflective liquid crystal panel 30 illustrated in FIG. 4 can be varied thereby to correct the back focus.

Consequently, according to the present embodiment, an offset back focus can be eliminated, thereby providing an image projector which does not cause an offset focus in the entire zooming even after field curvature adjustment.

Sixth Embodiment

A sixth embodiment is directed for suppressing a focus from being out in the zoom operation when the field curvature adjustment unit 1 is moved in the optical-axis direction. The sixth embodiment is similar to the first embodiment in other points, and thus the description thereof will be omitted.

As described according to the fifth embodiment, when the field curvature adjustment unit 1 is moved in the optical-axis direction to vary the projected image 14 in FIG. 1A, the lens with a refractive index is moved, and thus the back focus varies. When the back focus varies, the projected image is out of focus when being zoomed.

According to the present embodiment, a position of the focus adjustment unit 2 in the optical-axis direction is optically calculated in order to prevent an offset focus (varied focus position) at a predetermined zoom position when the field curvature adjustment unit 1 is moved by the predetermined amount. The correction amount of the focus adjustment unit 2 corresponding to the varied focus position is stored in the lens control board 13. In order to reflect individual differences such as component tolerance and production error, the correction amount of the focus adjustment unit 2 may be stored in the lens control board 13 in a manufacturing step.

When field curvature adjustment is performed, the adjustment amount is detected by the field curvature adjustment unit position detection sensor 7. A position of the zoom adjustment unit 3 is detected by the end detection sensor 12 for detecting a zoom adjustment position. The correction amount of the focus adjustment unit 2 is calculated on the basis of the information previously stored in the lens control board 13 and the detection result. The focus adjustment unit 2 is moved by the focus adjustment motor 9 by the calculated correction amount. In this way, it is possible to provide an image projector which does not cause an offset focus in the entire zooming even after field curvature adjustment.

Seventh Embodiment

A seventh embodiment is directed for enabling the lens apparatus 20 to be lens-shifted and tilt-adjusted. The seventh embodiment is similar to any of the above embodiments in other points, and thus the description thereof will be at least partially omitted.

Figure 12A:
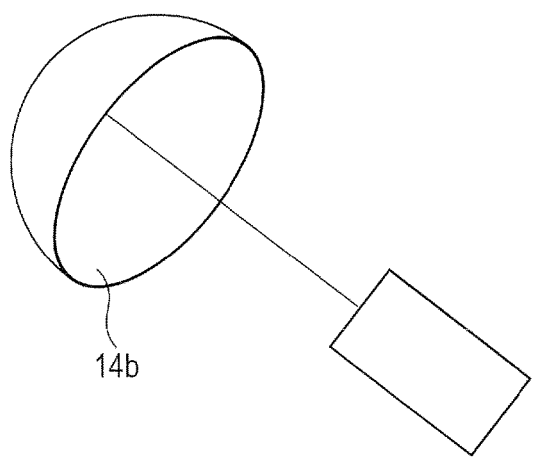
FIG. 12A is a perspective view illustrating a relationship between posture and position of the lens apparatus, and focus plane.

FIGS. 11A and 12A illustrate a relationship between the lens apparatus 20 and the focus plane 14b when lens shift is not performed, in which field curvature adjustment is made as described above so that the focus plane is the curved focus plane 14b.

Figure 12B:
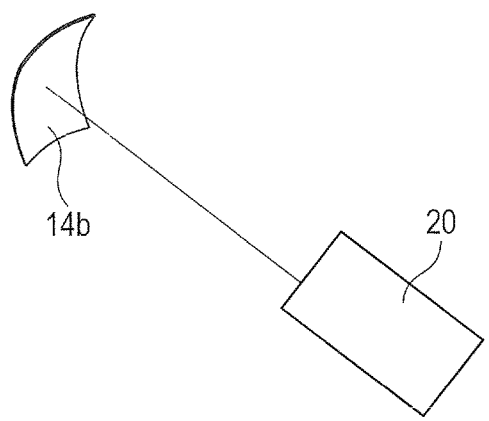
FIG. 12B is a perspective view illustrating a relationship between posture and position of the lens apparatus, and focus plane.
Figure 12C:
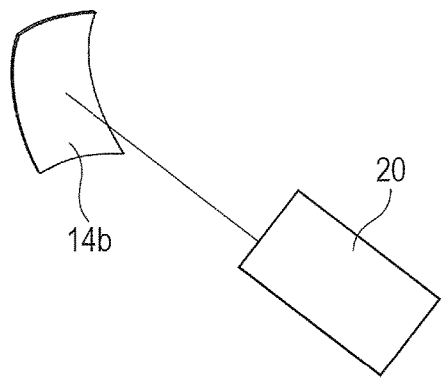
FIG. 12C is a perspective view illustrating a relationship between posture and position of the lens apparatus, and focus plane.

FIG. 12A illustrates the entire dome-shaped focus plane, and FIGS. 12B and 12C illustrate only part of the focus plane (part corresponding to a projected image actually projected on the screen in the focus plane).

Figure 15A:
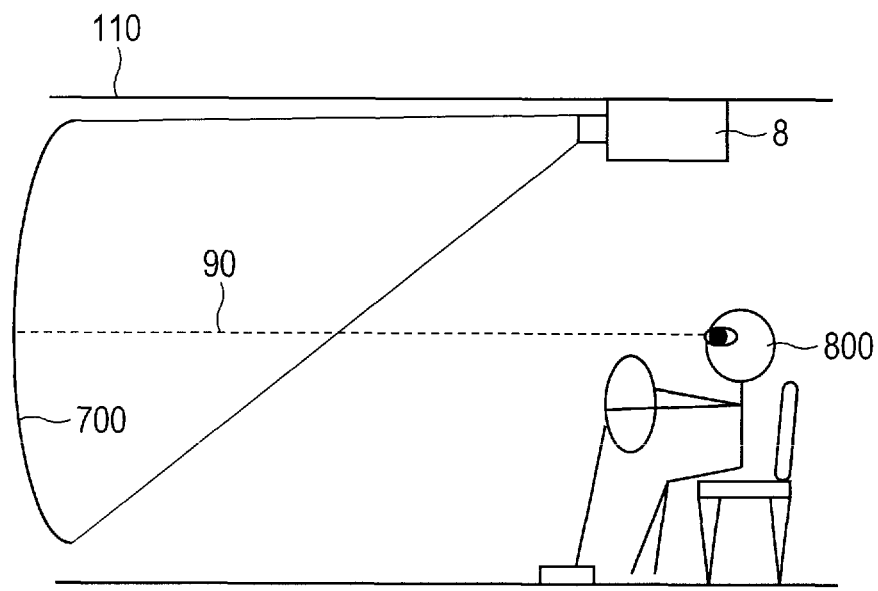
FIG. 15A is a diagram illustrating a configuration of an operation simulator.
Figure 15B:
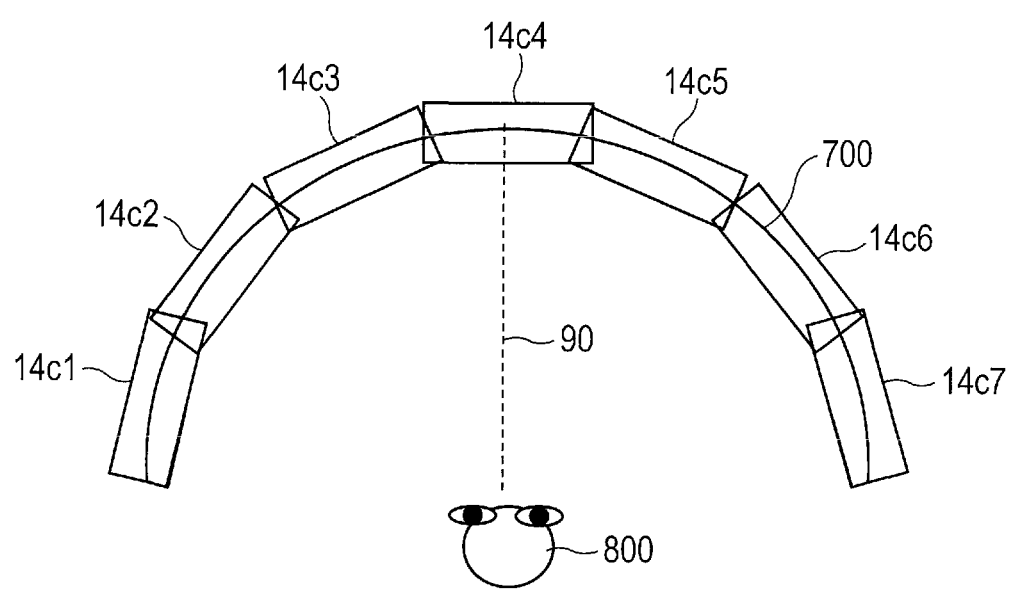
FIG. 15B is a diagram illustrating a configuration of the operation simulator.

The projector may be rotated by 90 degrees from a usual installation posture and installed in an operation simulator 110 as illustrated in FIGS. 15A and 15B described below.

FIGS. 11B and 12B illustrate a relationship between the lens apparatus 20 and the focus plane 14b when the projector is rotated by 90 degrees from the state illustrated in FIGS. 11A and 12A thereby to rotate a projected image by 90 degrees.

Some projection lenses for projector can be lens-shifted, and FIGS. 11C and 12C illustrate a relationship between the lens apparatus 20 and the focus plane 14c when the lens apparatus 20 is lens-shifted.

In this case, a different part on the focus plane 14b illustrated in FIG. 12A from FIGS. 11B and 12B is cut out to be the focus plane 14c different from the focus plane 14b.

Figure 13A:
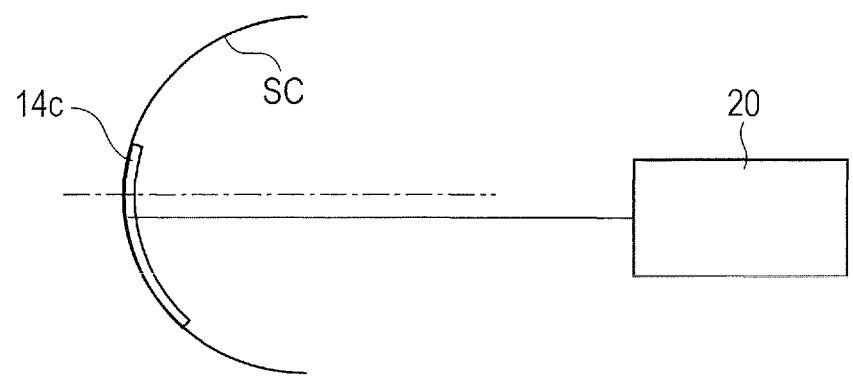
FIG. 13A is a diagram illustrating a difference in focus plane between when the lens apparatus is shifted and when it is tilted.

When lens shift is performed as illustrated in FIG. 11C, the focus plane 14c can be coincided with the doom-shaped screen SC in shape as illustrated in FIG. 13A, but the center of the screen SC is offset from the center of the projected image or the center of the focus plane.

Figure 13B:
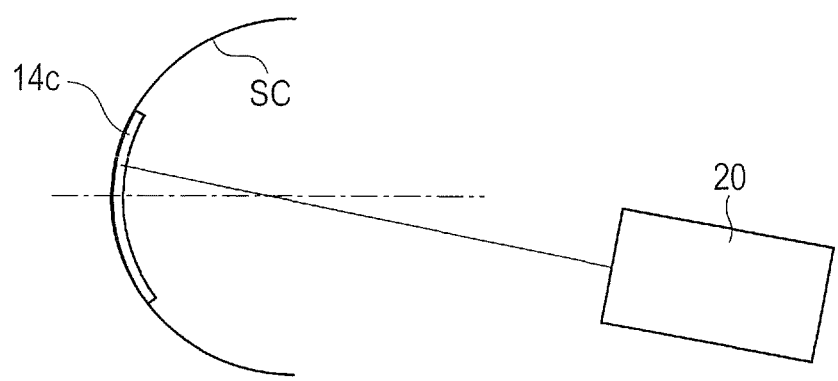
FIG. 13B is a diagram illustrating a difference in focus plane between when the lens apparatus is shifted and when it is tilted.

Thus, as illustrated in FIGS. 11D and 13B, the lens apparatus 20 is tilted so that the shape of the screen SC can be coincided with the shape of the focus plane 14c and the center of the screen SC can be also coincided with the center of the projected image.

Figure 14A:
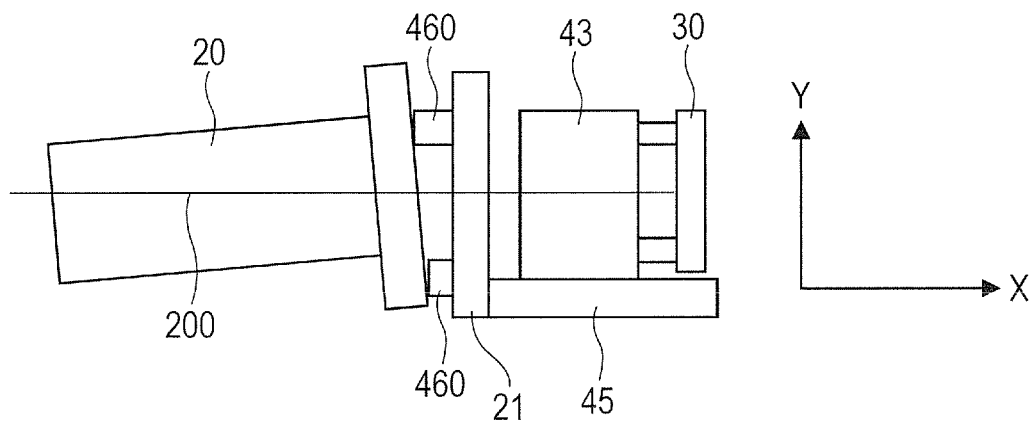
FIG. 14A is a diagram illustrating a configuration in which the lens apparatus is tilted.
Figure 14B:
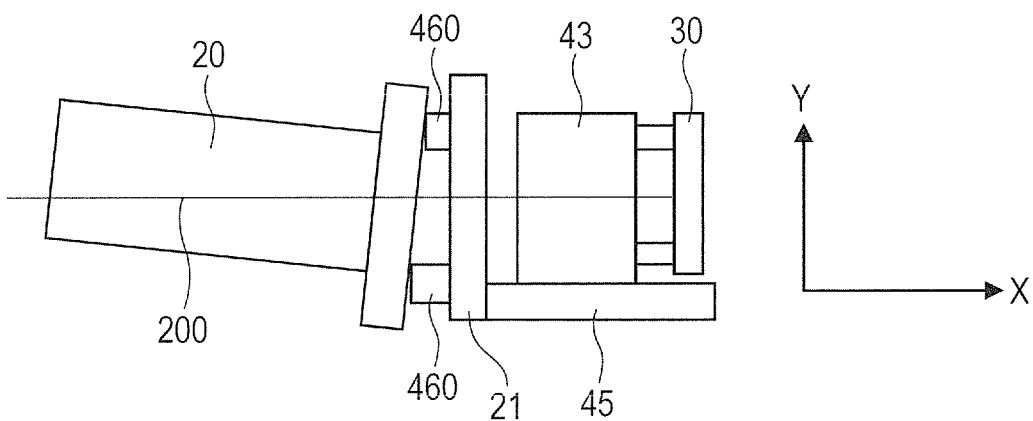
FIG. 14B is a diagram illustrating a configuration in which the lens apparatus is tilted.

FIGS. 14A and 14B illustrate that the lens apparatus 20 is tilted relative to an optical axis 200 of the illumination optical system.

As described in FIG. 6 and others, the lens apparatus 20 can move by the lens shift unit 21 in a direction orthogonal to the optical axis. That is, the lens shift unit 21 holds the lens apparatus 20 to be able to move the lens apparatus 20 in a direction orthogonal to the optical axis (in the Y direction and the Z direction in FIGS. 14A and 14B).

Similarly as in FIGS. 5A to 5D, in FIGS. 14A and 14B, combination prism 43, the reflective liquid crystal panel 30, and a color combination unit 45 for holding the combination prism 43 and the reflective liquid crystal panel 30 are provided, and the color combination unit 45 is fixed on the lens shift unit 21.

The lens expandable pin 46 is provided between the lens apparatus 20 and the lens shift unit 21 in FIGS. 5A to 5D, while tilting pins 460 are provided therebetween according to the present embodiment. The lens expandable pin 46 may serve as the tilting pins 460 or the tilting pins 460 may serve as the lens expandable pin 46. That is, one type of pin may serve as the lens expandable pin 46 and the tilting pins 460.

Figure 7A:
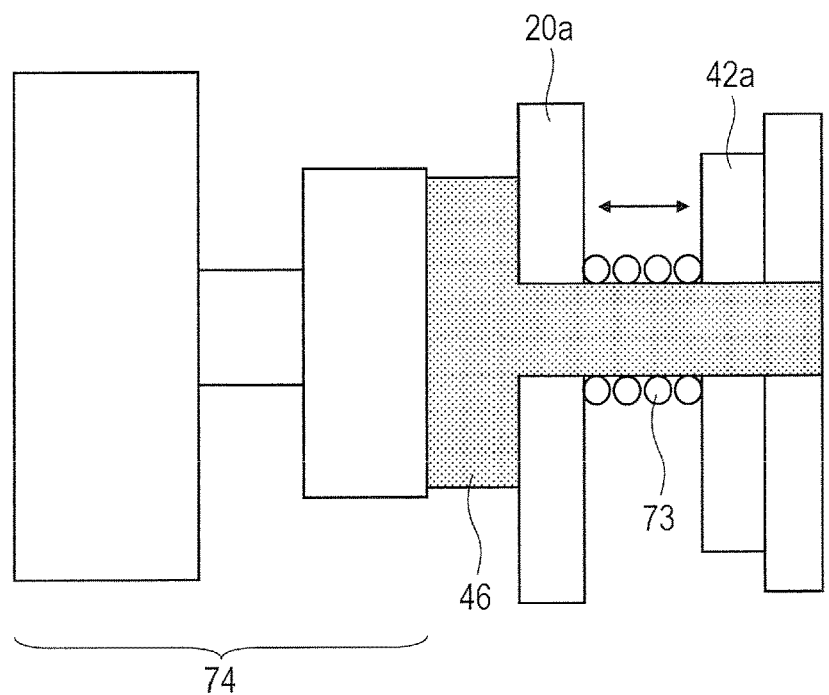
FIG. 7A is an explanatory diagram of an adjustment mechanism in the lens apparatus for making flange back adjustment according to the embodiments of the present invention.
Figure 7B:
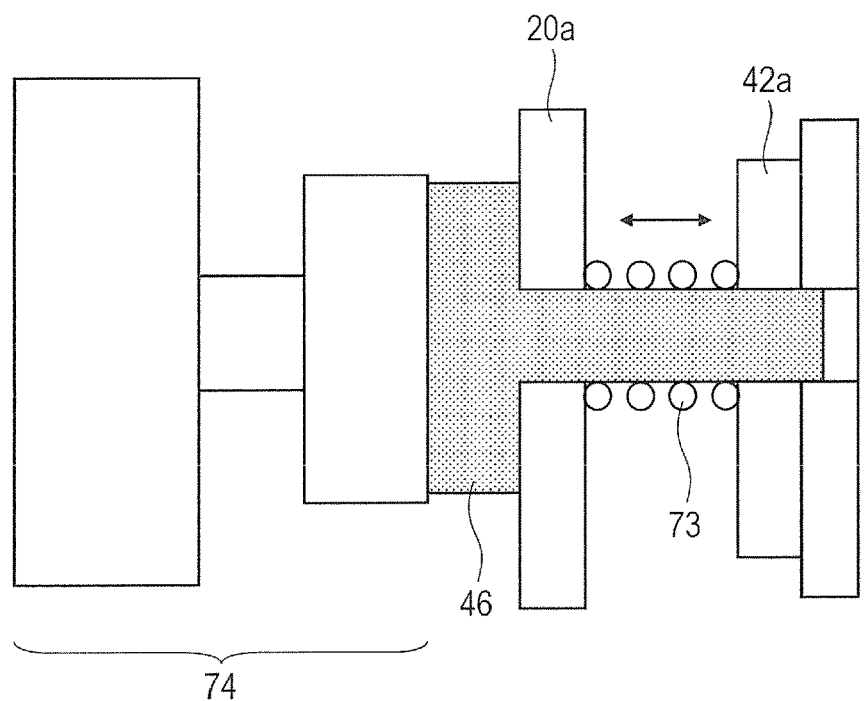
FIG. 7B is an explanatory diagram of the adjustment mechanism in the lens apparatus for making flange back adjustment according to the embodiments of the present invention.

As illustrated in FIGS. 14A and 14B, the tilting pins 460 expand or shrink so that the lens apparatus 20 can be tilted relative to the optical axis 200 of the illumination optical system, thereby achieving the state illustrated in FIG. 11D. A lens tilting mechanism using the tilting pins 460 may employ a similar configuration as in FIGS. 7A and 7B. That is, the tilting pins 460 may be employed instead of the lens expandable pin 46 and a lens tilting pin motor may be employed instead of the lens expandable pin motor 74 in FIGS. 7A and 7B. FIGS. 7A and 7B illustrate a component 20a as part of the lens apparatus 20, a spring 73, and a lens attachment unit 42a.

The lens tilting pin motor can be driven to change an interval between the lens apparatus 20 and the lens attachment unit. Consequently, the tilting pin 460 is expanded on the upper side of the sheet and the tilting pin 460 is shrunk or is not expanded on the lower side of the sheet in FIG. 14A so that the lens apparatus 20 can be tilted downward on the sheet as illustrated in FIG. 14A. A sensor for detecting the expansion/shrink amounts of the tilting pins 460 may be incorporated in the lens tilting pin motor.

FIG. 15A is a diagram illustrating the operation simulator 110 by way of example. The operation simulator 110 is a system for projecting images on a curved screen 700 by a plurality of projectors 8 and detecting an operation of an operator 800 thereby to change the images of the projectors 8. At this time, the environment of the operator 800 also varies in response to a detected operation, and the operation simulator 110 may entirely tilt or vibrate, for example.

With such a simulator, the center of the curved screen 700 is arranged on an extension of a line of sight 90 of the operator 800, for example. It is good that the projectors 8 are installed at the position of eyes of the operator 800, but the projectors 8 cannot be actually installed at the position, and thus the projectors 8 are attached on the ceiling, for example, as illustrated in FIG. 15A and are lens-shifted downward on the sheet of FIG. 15A thereby to prevent the projected images from being blocked by the operator 800.

FIG. 15B illustrates a state in which the curved screen 700 is divided into regions 14c1 to 14c7 by use of a total of seven projectors 8 to display the images on the curved screen 700. FIG. 15B illustrates that the lens apparatus 20 is tilted as illustrated in FIG. 11D or FIGS. 14A and 14B so that the focus plane, on which each projector 8 intentionally causes field curvature and which is lens-shifted as illustrated in FIG. 15A, is fit to the curved screen 700. The field curvature adjustment unit 1 illustrated in FIG. 1A may be moved in the optical-axis direction by operating a field curvature adjustment grip 10 illustrated in FIG. 1B in order to intentionally cause field curvature.

A degree of field curvature (such as curvature radius) can be calculated on the basis of a position of the field curvature adjustment unit 1. Further, a region on the focus plane 14b in FIG. 12A to be cut out as focus plane of a projected image can be also calculated by lens shift on the basis of a position of the lens shift unit 21 on the YZ plane coordinate. As described with reference to FIG. 1B, a position of the field curvature adjustment unit 1 can be calculated by the field curvature adjustment unit position detection sensor 7. A position of the lens shift unit 21 on the YZ plane coordinate can be calculated by the Z-direction position detection sensor 58 and the Y-direction position detection sensor 61 as described in FIG. 6.

The lens control board 13 stores information capable of calculating a plane to be cut out (in FIG. 11C, for example) as focus plane of a projected image on the basis of the information of the field curvature adjustment unit position detection sensor 7, the Y-direction position detection sensor 61, and the Z-direction position detection sensor 58. The lens control board 13 stores information capable of calculating the amount to tilt the lens apparatus 20 (in FIG. 11D, for example) in order to make the calculated focus plane (in FIG. 11C, for example) closer to a state where lens shift is not performed.

In order to make a plane cut out as focus plane of a projected image closer to a state where lens shift is not performed, it is preferred that a difference in position in the optical-axis direction among the four corners of the screen in FIG. 11C is reduced. The lens tilting pin motors at a total of four places are driven by the arbitrary amount to tilt the lens apparatus 20 in order to realize the calculated tilt amount of the lens apparatus 20.

Under the control, it is possible to provide a projection display device capable of accurately fitting a focus plane to the curved screen also on field curvature adjustment and lens shift movement.

In order to more strictly calculate the tilt amount of the lens apparatus 20, it is desirable that component tolerance or assembly error in a factory is considered.

Therefore, a degree of field curvature relative to a detected position of the field curvature adjustment unit position detection sensor 7 may be measured in a manufacturing step and stored in the lens control board 13. A region to be cut out as focus plane of a projected image may be measured relative to the detected positions of the Z-direction position detection sensor 58 and the Y-direction position detection sensor 61 in a manufacturing step, and may be stored in the lens control board 13. The lens tilting pin motors at a total of four places are driven by the arbitrary amount to tilt the lens apparatus 20 as described above on the basis of the information in order to realize the calculated tilt amount of the lens apparatus 20.

The adjustment amount may be stored in a tilt amount storage unit for storing the adjustment amount of the lens tilting pins, or the information for calculating the adjustment amount may be stored thereby to calculate the adjustment amount on the basis of the detected values and the stored information.

The exemplary configuration including the lens tilting pins and the lens tilting pin motors as lens tilting units has been described according to the present embodiment, but a configuration of the lens tilting units is not limited to the configuration. The exemplary configuration in which the lens control board serves as the tilt amount storage unit has been described according to the present embodiment, but there may be employed a configuration in which the lens control board and the tilt amount storage unit are separately provided.

MODIFIED EXAMPLES

The preferred embodiments of the present invention have been described above, but the present invention is not limited to the embodiments, and can be variously modified or changed within the scope of the spirit.

Modified Example 1

The field curvature amount is determined by a curvature radius of the screen according to the above embodiments, but a distance (interval) between the back and the front (the center part and the peripheral part) of the screen in the optical-axis direction may be input, and if a degree of field curvature can be defined, the input conditions are not particularly limited.

Modified Example 2

The spherical screen is concave toward the image projector according to the above embodiments, but is not limited thereto and may be convex toward the image projector.

Modified Example 3

The lens apparatus includes the storage unit (provided in the lens control board 13) and the input unit (the remote controller 100) according to the above embodiments, but both or one of them may not be provided as component configuring the image projector in the lens apparatus.

Modified Example 4

The above embodiments have been described assuming that the lens apparatus 20 as projection optical system held by the lens holding member (holding member) is fixed on the main body of the image projector, but may be detachably provided as interchangeable lens on the lens holding member (holding member).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-200022, filed Oct. 11, 2016, and Japanese Patent Application No. 2017-167282, filed Aug. 31, 2017, which are hereby incorporated by reference herein in their entirety.

What is claimed is:

1. A lens apparatus comprising:
    a first optical system for changing a field curvature by moving in an optical-axis direction;
    a control unit for moving the first optical system to a target position in the optical-axis direction specified based on a predetermined amount input as a field curvature amount while a relationship between a position of the first optical system in the optical-axis direction and the field curvature amount is previously stored;
    a position detection unit for detecting a reference position of the first optical system in the optical-axis direction; and
    a movement amount detection unit for detecting a movement amount of the first optical system from the reference position to the target position in the optical-axis direction.

2. The lens apparatus according to claim 1, further comprising:
    a storage unit for storing a relationship between a position of the first optical system in the optical-axis direction and the field curvature amount.

3. The lens apparatus according to claim 1, further comprising:
    a second optical system for changing a focus state by moving in the optical-axis direction, wherein the control unit moves the second optical system in the optical-axis direction to suppress a change in focus state when moving the first optical system to the target position.

4. The lens apparatus according to claim 1, further comprising:
a third optical system for changing a magnification by moving in the optical-axis direction,
wherein the control unit moves the third optical system in the optical-axis direction to suppress a change in magnification when moving the first optical system to the target position.

5. The lens apparatus according to claim 1,
wherein the control unit controls an illuminance changing unit for changing illuminance within an image plane to suppress irregular illuminance within an image plane specified based on the target position while a relationship between a position of the first optical system in the optical-axis direction and irregular illuminance within the image plane is previously stored.

6. An image projector comprising:
an image generation unit for generating an image; and
a holding member capable of holding a lens apparatus,
wherein the lens apparatus comprises:
a first optical system for changing a field curvature by moving in an optical-axis direction;
a control unit for moving the first optical system to a target position in the optical-axis direction specified based on a predetermined amount input as a field curvature amount while a relationship between a position of the first optical system in the optical-axis direction and the field curvature amount is previously stored;
a position detection unit for detecting a reference position of the first optical system in the optical-axis direction; and
a movement amount detection unit for detecting a movement amount of the first optical system from the reference position to the target position in the optical-axis direction.

7. The image projector according to claim 6, further comprising:
a storage unit for storing a relationship between a position of the first optical system in the optical-axis direction and the field curvature amount.

8. The image projector according to claim 6, further comprising:
an illuminance changing unit for changing illuminance within an image plane to suppress irregular illuminance within an image plane specified based on the target position while a relationship between a position of the first optical system in the optical-axis direction and irregular illuminance within the image plane is previously stored,
wherein the illuminance changing unit is any one of a stop provided in the lens apparatus, the image generation unit for generating the image, and a stop provided in an optical path of illumination light from a light source for illuminating the image generation unit.

9. The image projector according to claim 6, further comprising:
a distance changing unit for changing a distance between the image generation unit and the lens apparatus in the optical-axis direction,
wherein the control unit controls the distance changing unit to reduce a back focus variation specified based on the target position while a relationship between a position of the first optical system and the back focus variation is stored.

10. The image projector according to claim 6, further comprising:
a second optical system for changing a focus state by moving in the optical-axis direction,
wherein the control unit controls a movement of the second optical system to reduce a focus position variation specified based on the target position while a relationship between a position of the first optical system and the focus position variation is stored.

11. The image projector according to claim 6, further comprising:
a lens shift unit capable of moving the lens apparatus in a direction perpendicular to the optical-axis direction;
a lens shift position detection unit for detecting a position of the lens shift unit;
a lens tilting unit capable of tilting the lens apparatus relative to the image generation unit; and
a tilt amount storage unit for storing an adjustment amount of the lens tilting unit at a predetermined position of the lens shift unit and at a position of the first optical system,
wherein the control unit drives the lens tilting unit based on detection results of the position detection unit and the movement amount detection unit, a detection result of the lens shift position detection unit, and the adjustment amount stored in the tilt amount storage unit.

12. The image projector according to claim 11,
wherein the adjustment amount stored in the tilt amount storage unit corresponds to that for reducing a difference in focal position in the optical-axis direction among four corners of a projection screen at the predetermined position of the lens shift unit and at the position of the first optical system.

13. The image projector according to claim 11,
wherein the tilt amount storage unit is provided in the lens apparatus.

14. The image projector according to claim 11,
wherein the tilt amount storage unit stores information capable of calculating a tilt amount of the lens tilting unit based on information on a position of the first optical system and a position of the lens shift unit.

15. A lens apparatus comprising:
a first optical system for changing a field curvature by moving in an optical-axis direction;
a control unit for moving the first optical system to a target position in the optical-axis direction specified based on a predetermined amount input as a field curvature amount while a relationship between a position of the first optical system in the optical-axis direction and the field curvature amount is previously stored; and
an absolute encoder for detecting a position of the first optical system in the optical-axis direction.

16. An image projector comprising:
an image generation unit for generating an image; and
a holding member capable of holding a lens apparatus,
wherein the lens apparatus comprises:
a first optical system for changing a field curvature by moving in an optical-axis direction;
a control unit for moving the first optical system to a target position in the optical-axis direction specified based on a predetermined amount input as a field curvature amount while a relationship between a position of the first optical system in the optical-axis direction and the field curvature amount is previously stored; and an absolute encoder for detecting a position of the first optical system in the optical-axis direction.

* * * * *